United States Patent
Chen et al.

(10) Patent No.: US 9,164,959 B1
(45) Date of Patent: *Oct. 20, 2015

(54) DISCRETE FOURIER TRANSFORM CALCULATION METHOD AND APPARATUS

(71) Applicant: MARVELL INTERNATIONAL LTD., Hamilton (BM)

(72) Inventors: Yanni Chen, Sunnyvale, CA (US); Rajesh Juluri, San Jose, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 283 days.

This patent is subject to a terminal disclaimer.

(21) Appl. No.: 13/741,141

(22) Filed: Jan. 14, 2013

Related U.S. Application Data

(63) Continuation of application No. 11/936,484, filed on Nov. 7, 2007, now Pat. No. 8,356,064.

(60) Provisional application No. 60/864,640, filed on Nov. 7, 2006.

(51) Int. Cl.
    *G06F 17/14* (2006.01)

(52) U.S. Cl.
    CPC .................................... *G06F 17/142* (2013.01)

(58) Field of Classification Search
    None
    See application file for complete search history.

(56) References Cited

U.S. PATENT DOCUMENTS

| | | | |
|---|---|---|---|
| 4,689,762 A | 8/1987 | Thibodeau, Jr. | |
| 6,330,580 B1 | 12/2001 | Giaume et al. | |
| 7,657,587 B2 * | 2/2010 | Wezelenburg | 708/404 |
| 8,356,064 B1 * | 1/2013 | Chen et al. | 708/404 |
| 2006/0253513 A1 * | 11/2006 | Wezelenburg | 708/404 |
| 2009/0013021 A1 | 1/2009 | Jhang et al. | |

OTHER PUBLICATIONS

IEEE Std 802.11a-1999 (Supplement to IEEE Std 802.11-1999) "Supplement to IEEE Standard for Information Technology—Telecommunications and information exchange between systems—Local and metropolitan area networks—Specific requirements, Part 11: Wireless LAN Medium Access Control (MAC) and Physical Layer (PHY) Specifications: High-speed Physical Layer in the 5 Ghz Band," *The Institute of Electrical and Electronics Engineers, Inc.*, Sep. 16, 1999.

IEEE Std 802.16-2001 "IEEE Standard for Local and metropolitan area networks: Part 16: Air Interface for Fixed Broadband Wireless Access Systems," *The Institute of Electrical and Electronics Engineers, Inc.*, Apr. 8, 2002.

(Continued)

*Primary Examiner* — David H Malzahn

(57) ABSTRACT

A discrete Fourier transform calculation apparatus includes a plurality of multiplier units, and a plurality of butterfly calculation units. Each butterfly calculation unit is configured to perform simultaneous calculations for at least two stages of a fast Fourier transform (FFT) algorithm by using shared resources of the butterfly calculation unit. Each butterfly calculation unit includes a respective memory device to store input data for the corresponding at least two stages of the FFT algorithm, and a respective butterfly calculator coupled to the respective memory device. Each butterfly calculation unit also includes a respective controller coupled to the respective memory device and the respective butterfly calculator. The respective controller is configured to control the corresponding butterfly calculation unit to calculate the corresponding at least two stages of the FFT algorithm. The plurality of butterfly calculation units and the plurality of multiplier units are coupled in series.

20 Claims, 9 Drawing Sheets

(56) References Cited

OTHER PUBLICATIONS

IEEE Std 802.16-2004 (Revision of IEEE Std 802.16-2001), "IEEE Standard for Local and metropolitan area networks; Part 16: Air Interface for Fixed Broadband Wireless Access Systems," *The Institute of Electrical and Electronics Engineers, Inc.*, Oct. 1, 2004.

IEEE Std 802.16e-2005 and IEEE Std 802.16-2004/Cor1-2005 (Amendment and Corrigendum to IEEE Std 802.16-2004), "IEEE Standard for Local and metropolitan area networks: Part 16: Air Interface for Fixed and Mobile Broadband Wireless Access Systems: Amendment 2: Physical and Medium Access Control Layers for Combined Fixed and Mobile Operation in Licensed Bands and Corrigendum 1," *The Institute of Electrical and Electronics Engineers, Inc.*, Feb. 28, 2006.

IEEE Std 802.11g-/D2.8 May 2002 (Supplement to ANSI/IEEE Std 802.11, 1999), "Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band," *The Institute of Electrical and Electronics Engineers, Inc.*, May 2002.

IEEE Std 802.11g/D8.2, Apr. 2003, (Supplement) to ANSI/IEEE Std 802.11, 1999(Reaff 2003)) "Draft Supplementl to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, Apr. 2003.

F. Kristensen et al., "Flexible Baseband Transmitter for OFDM," IASTED International Conference Circuits, Signals, and Systems (CSS'03), Cancun, Mexico, May 19-21, 2003.

J. Chi et al., "An Efficient FFT Twiddle Factor Generator," European Signal Processing Conference, Sep. 6-10, 2004, Vienna, Austria (EUSIPCO 2004).

\* cited by examiner

DISCRETE FOURIER TRANSFORM CALCULATION METHOD AND APPARATUS

CROSS-REFERENCES TO RELATED APPLICATIONS

The present application is a continuation of U.S. patent application Ser. No. 11/936,484, now U.S. Pat. No. 8,356,064, entitled "Discrete Fourier Transform Calculation Method and Apparatus," filed Nov. 7, 2007, which claims the benefit of U.S. Provisional Application No. 60/864,640, entitled "An Area Efficient Radix-$2^2$ Pipelined Architecture for FFT," filed on Nov. 7, 2006. The patent applications referenced above are hereby incorporated by reference herein in their entireties.

FIELD OF THE DISCLOSURE

The present disclosure relates generally to digital circuitry and, more particularly, to digital circuitry for calculating a discrete Fourier transform.

BACKGROUND

Mathematical transforms, such as Fourier transforms, are an important tool for scientific study, signal processing systems, and communication systems. For example, a communication technique now commonly used and referred to as orthogonal frequency division multiplexing (OFDM) employs a discrete Fourier transform (DFT) operation as one of its key steps. DFT converts a finite sequence of numbers into a finite set of sinusoidal components, and OFDM utilizes DFT in demodulation to separate a plurality of orthogonal signals transmitted on different sub-carriers. OFDM is utilized in a variety of communication systems such as wireless local area networks (e.g., the IEEE Standard 802.11a/g), wireless metropolitan area networks (e.g., IEEE Standard 802.16, also known as "WiMAX"), power line communication (PLC) systems, home networking systems (e.g., the Multimedia over Coax Alliance (MoCA) specification), optical communication systems, digital audio broadcast systems (e.g., EUREKA 147, Digital Radio Mondiale, HD Radio, T-DMB and ISDB-TSB), cellular communication systems, digital television broadcast systems (e.g., DVB-T, DVB-H, T-DMB and ISDB-T), etc.

A class of algorithms for efficiently calculating a DFT is referred to as fast Fourier transform (FFT) algorithms. FFT algorithms may be implemented in either hardware or software. For real-time and/or high throughput implementations, an FFT is often implemented using hardware. Different types of FFT algorithms lead to different hardware architectures. One broad class of architecture that may be used to implement an FFT algorithm is a pipelined architecture.

FIG. 1 is a block diagram of a prior art pipelined FFT calculator 100 for implementing a particular FFT algorithm referred to as a radix-$2^2$ decimation in frequency (DIF) algorithm. In particular, the FFT calculator 100 is for calculating a 1024-point FFT (i.e., 1024 inputs are converted to 1024 outputs). The FFT calculator 100 includes ten butterfly calculation units 104, 108, 112, 116, 120, 124, 128, 132, 136 and 140. The FFT calculator 100 also includes four multiplier units 144, 148, 152 and 156. The FFT calculator 100 will be further described with reference to FIG. 2.

FIG. 2 is a flow diagram of a 4-point radix-$2^2$ DIF algorithm 170. In general, an N-point radix-$2^2$ DIF algorithm comprises $\log_2 N$ stages (hereinafter referred to as FFT stages). Thus, in FIG. 2, the 4-point radix-$2^2$ DIF algorithm includes two FFT stages. Each FFT stage includes a plurality of operations that are referred to as butterfly operations. A butterfly operation includes adding two input values to generate a first output value, and subtracting the same two input values to generate a second output value. Thus, the first stage of the algorithm 170 includes a first butterfly operation involving inputs x(n) and x(n+2) and a second butterfly operation involving inputs x(n+1) and x(n+3).

In an FFT stage, each output of a butterfly operation is multiplied by a complex-valued parameter, but in some cases the parameter may merely be real value of one or a value of –j. Thus, when implementing a radix-$2^2$ DIF algorithm in hardware, it may be possible to omit a complex-value multiplier in some of the FFT stages. For example, in the first FFT stage of the algorithm 170, three of the outputs are multiplied by real-valued one and the remaining output is multiplied by –j. Thus, hardware for implementing the first FFT stage may omit a complex-value multiplier. Rather, the multiply by –j operation may be implemented using logic to swap the real and imaginary components of an output and to change the sign of the new imaginary component.

On the other hand, in the second FFT stage of the algorithm 170, three of the outputs are multiplied by complex-valued parameters W1, W2 and W3 (often referred to as "twiddle factors"). Thus, a complex multiplier is needed for the second FFT stage.

An FFT stage may potentially include a butterfly calculation (BF) stage and a multiplier stage. A BF stage calculates butterfly calculations for an FFT stage. If an FFT stage only requires a multiply by –j, such an FFT stage may omit a multiplier stage and rather include logic to implement the multiply by –j such as the logic described above. Thus, in the algorithm 170, the first FFT stage includes a BF stage and omits a multiplier stage, whereas the second FFT stage includes both a BF stage and a multiplier stage.

As discussed above, FIG. 2 corresponds to a 4-point radix-$2^2$ DIF algorithm and includes two FFT stages. In general, an N-point radix-$2^2$ DIF algorithm, where N is a power of two, will have $\log_2 N$ FFT stages. For example, a 1024-point radix-$2^2$ DIF algorithm will have ten FFT stages (first, second, . . . , tenth). Similarly, an N-point radix-$2^2$ DIF algorithm, where N is a power of two, will have $\log_2 N$ BF stages. For example, a 1024-point radix-$2^2$ DIF algorithm will have ten BF stages (first, second, . . . , tenth).

Referring again to FIG. 1, each of the ten butterfly calculation units 104, 108, 112, 116, 120, 124, 128, 132, 136 and 140 corresponds to an FFT stage of the 1024 point radix-$2^2$ DIF algorithm. More specifically, each of the ten butterfly calculation units 104, 108, 112, 116, 120, 124, 128, 132, 136 and 140 corresponds to a BF stage. Each of the five butterfly calculation units 104, 112, 120, 128 and 136 correspond to a BF stage similar to the first BF stage of FIG. 2 in that they include logic to implement a multiply by –j, whereas each of the five butterfly calculation units 108, 116, 124, 132 and 140 correspond to a BF stage similar to the second BF stage of FIG. 2 in that they do not include such logic. Similarly, each of the four multiplier units 144, 148, 152 and 156 corresponds to a multiplier stage of the 1024-point radix-$2^2$ DIF algorithm.

Each of the butterfly calculation units 104, 108, 112, 116, 120, 124, 128, 132, 136 and 140 includes a respective memory 160, a respective butterfly calculator 162, and a respective controller 164. The memory 160 is for storing inputs to the butterfly calculation unit so that the inputs can be used for later calculations. Referring to FIG. 2, inputs to a butterfly calculation unit may be received in sequence in the following order: x(n), x(n+1), x(n+2), x(n+3), where x is an input value and n is an index. Thus, in order to calculate the stage output 174 (i.e., x(n)−x(n+2)), the value x(n) must be stored until the value x(n+2) is received.

One of ordinary skill in the art will understand that a first FFT stage of an N-point radix-$2^2$ DIF algorithm, where N is a power of 2, will require at least N/2 memory locations, and each subsequent stage will require ½ the memory locations of the previous stage. Referring again to FIG. 1, the memories 160 may include 512, 256, 128, 64, 32, 16, 8, 4, 2 and 1 memory locations for the butterfly calculation units 104, 108, 112, 116, 120, 124, 128, 132, 136 and 140, respectively.

Each butterfly calculator 162 performs additions and subtractions for the butterfly calculation unit. Each control unit 164 generally controls the butterfly calculation unit to generate outputs for the stage. For example, the control unit 164 may configure the butterfly calculator 162 to perform either an addition or a subtraction. Additionally, the control unit 164 may route appropriate values from the memory 160 to the butterfly calculator 162. Further, the control unit 164 may change the sign of an imaginary component of an output when appropriate.

Each of the multiplier units 144, 148, 152, and 156 corresponds to an FFT stage of the 1024-point radix-$2^2$ DIF algorithm that requires a complex multiplier. More specifically, each of the multiplier units 144, 148, 152, and 156 corresponds to a multiplier stage, such as the multiplier stage of FIG. 2. Each of the multiplier units 144, 148, 152, and 156 includes a respective memory 166 and a respective complex multiplier 168. The memory 166 is for storing complex valued "twiddle factors". One of ordinary skill in the art will understand that a first multiplier stage of an N-point radix-$2^2$ DIF algorithm, where N is a power of 2, will be configured to multiply using approximately N/8 different twiddle factors, and each subsequent multiplier stage will use approximately ¼ the number of twiddle factors of the previous multiplier stage. Thus, the memories 166 may include 128, 32, 8 and 2 memory locations for the multiplier units 144, 148, 152 and 156, respectively.

In operation, input values (i.e., x(n), x(n+1, x(n+2), . . . ) are provided sequentially to the butterfly calculation unit 104, which stores 512 input values in its memory 160. Once 512 input values have been stored, the butterfly calculation unit 104 begins calculating outputs that correspond to outputs of the first stage of the 1024-point FFT algorithm, which is similar to the first FFT stage in FIG. 2. These outputs are sequentially provided to the butterfly calculation unit 108, which stores 256 of these values in its memory 160. Once 256 values have been stored, the butterfly calculation unit 108 begins calculating outputs that correspond to outputs of the second BF stage of the 1024-point FFT algorithm, which is similar to the second BF stage in FIG. 2. These outputs are sequentially provided to the multiplier unit 144, which multiplies each output of the butterfly calculation unit 108 by a corresponding twiddle factor value stored in its memory 166. Outputs of the multiplier unit 144 are provided to the butterfly calculation unit 112. In a similar manner, the remainder of the butterfly calculation units and multiplier units operate to calculate the other stages of the FFT algorithm. Eventually, output values are generated by the butterfly calculation unit 140.

SUMMARY OF THE DISCLOSURE

In one embodiment, a discrete Fourier transform calculation apparatus comprises a plurality of multiplier units and a plurality of butterfly calculation units. Each butterfly calculation unit is configured to perform simultaneous calculations for at least two stages of a fast Fourier transform (FFT) algorithm by using shared resources. Each butterfly calculation unit includes a respective memory device to store input data for both of the corresponding at least two stages of the FFT algorithm, and a respective butterfly calculator coupled to the respective memory device. Each butterfly calculation unit also includes a respective controller coupled to the respective memory device and the respective butterfly calculator. The respective controller is configured to control the corresponding butterfly calculation unit to calculate the corresponding at least two stages of the FFT algorithm. The plurality of butterfly calculation units and the plurality of multiplier units are coupled in series.

In another embodiment, a butterfly calculation unit for use in a pipelined discrete Fourier transform calculator and for performing calculations for at least two stages of an FFT algorithm comprises a memory device to store input data for the at least two stages of the FFT algorithm. The butterfly calculation unit also comprises a butterfly calculator coupled to the memory device, and a controller coupled to the memory device and the butterfly calculator. The controller is configured to control the butterfly calculation unit to calculate the at least two stages of the FFT algorithm. Additionally, the butterfly calculation unit is configured to use shared resources to simultaneously calculate at least two stages of the FFT algorithm.

In yet another embodiment, a method of calculating multiple stages of an FFT algorithm includes providing data to a butterfly calculation unit, and using shared resources of the butterfly calculation unit to perform calculations for a first stage of the FFT algorithm simultaneously with performing calculations for at least a second stage of the FFT algorithm.

In still another embodiment, a discrete Fourier transform calculation apparatus comprises a plurality of multiplier means and a plurality of butterfly calculation means. Each butterfly calculation means is for performing simultaneous calculations for at least two stages of an FFT algorithm by using shared resources. Each butterfly calculation means includes a respective memory means for storing input data for the corresponding at least two stages of the FFT algorithm, and a respective butterfly calculator means coupled to the respective memory means. Each butterfly calculator means is for performing butterfly calculations. Each butterfly calculation means also includes a respective control means coupled to the respective memory means and the respective butterfly calculator means. The respective control means is for controlling the corresponding butterfly calculation means to calculate the corresponding at least two stages of the FFT algorithm. Each multiplier means is for multiplying data by corresponding twiddle factors. The plurality of butterfly calculation means and the plurality of multiplier means are coupled in series.

In yet another embodiment, a method of calculating an FFT algorithm includes providing data to a butterfly calculation unit, and using shared resources of the butterfly calculation unit to perform simultaneous calculations for at least two stages of the FFT algorithm. The method also includes providing output of the butterfly calculation unit to a multiplier unit, and multiplying the output by twiddle factors using the multiplier unit. The method additionally includes providing output of the multiplier unit to a subsequent butterfly calculation unit, and using shared resources of the subsequent butterfly calculation unit to perform simultaneous calculations for at least two other stages of the FFT algorithm. Similarly, data may be provided to one or more further calculation units and/or multiplier units to complete calculation of the FFT algorithm.

DETAILED DESCRIPTION

Figure 3:
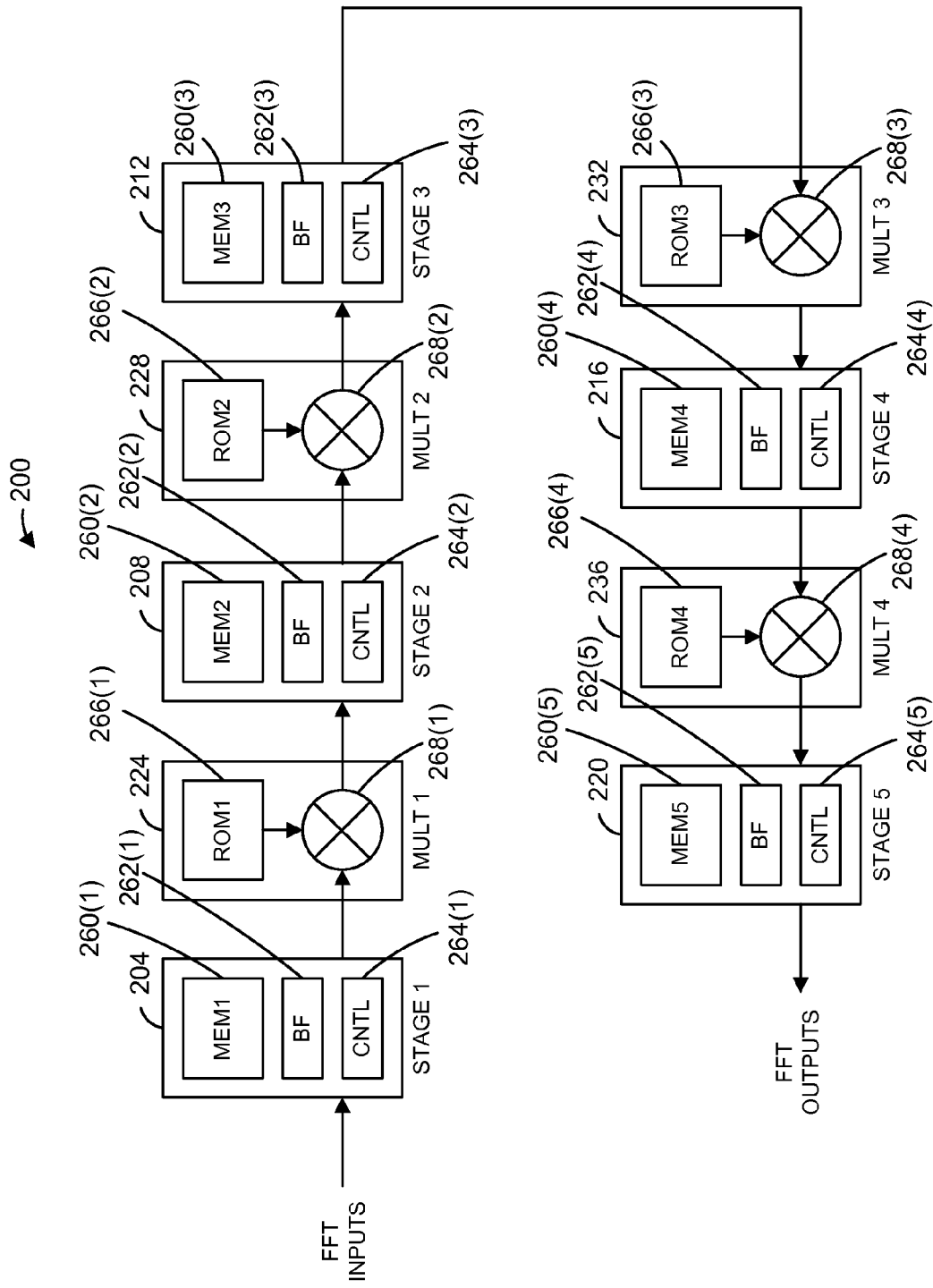
FIG. 3 is a block diagram of an example pipelined FFT calculator.

FIG. 3 is a block diagram of an example pipelined FFT calculator 200 for implementing the radix-$2^2$ DIF FFT algorithm. In particular, the example FFT calculator 200 is for calculating a 1024-point FFT. The FFT calculator 200 may be utilized in a communication device that operates according to the IEEE Standard 802.11a, 802.11g, and/or 802.16, for example. Of course, the FFT calculator 200 may be utilized in many other types of devices that require the calculation of a 1024-point DFT.

The FFT calculator 200 includes five butterfly calculation units 204, 208, 212, 216 and 220. The FFT calculator 200 also includes four multiplier units 224, 228, 232 and 236. The FFT calculator 200 operates at a clock speed that is at least two times the effective sampling rate of the input signal to the FFT calculator 200. One of ordinary skill in the art will recognize that the effective sampling rate of the input signal may be different from the actual sampling rate of a signal from which the input signal is derived. For example, in one particular implementation, the input signal to the FFT calculator 200 may be a decimated signal obtained from an 8-times oversampled signal. In this implementation, the FFT calculator 200 may operate at a clock speed that is eight times the effective sampling rate of the input signal. In other implementations, the input signal need not be a decimated signal. For example, the FFT calculator 200 may merely operate at a higher clock speed than the actual sampling rate. The FFT calculator 200 will be further described with reference to FIG. 2.

Figure 2:
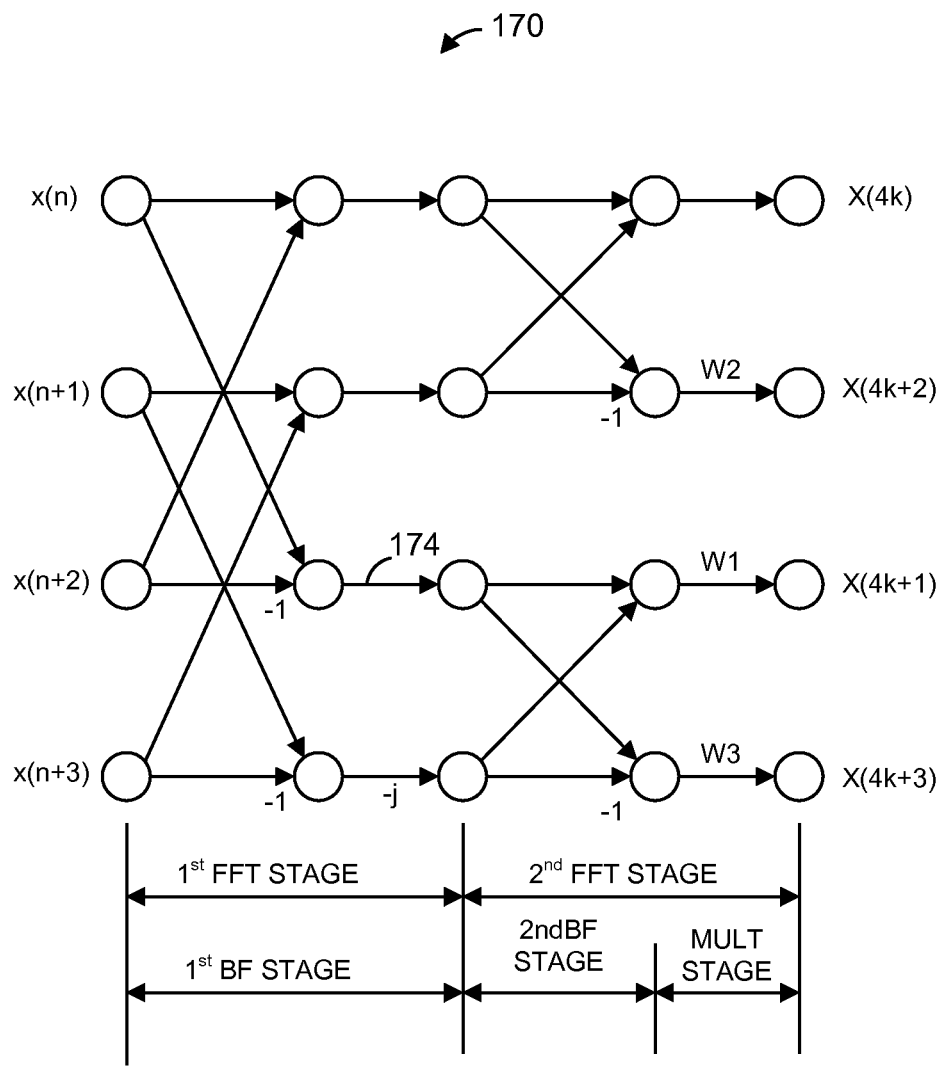
FIG. 2 is a flow diagram of an FFT algorithm.

Each of the five butterfly calculation units 204, 208, 212, 216 and 220 corresponds to a pair of FFT stages of the 1024-point radix-$2^2$ DIF algorithm. More specifically, each of the five butterfly calculation units 204, 208, 212, 216 and 220 corresponds to a pair of BF stages and implements a pair of BF stages. Specifically, the butterfly calculation unit 204 implements the first and second BF stages, the unit 208 implements the third and fourth BF stages, the unit 212 implements the fifth and sixth BF stages, the unit 216 implements the seventh and eighth stages, and the unit 220 implements the ninth and tenth stages. Referring to FIG. 2, each of the five butterfly calculation units 204, 208, 212, 216 and 220 corresponds to and implements a pair of BF stages similar to the first and second BF stages of FIG. 2 in that one of the BF stages includes logic to implement a multiply by –j. Similarly, each of the four multiplier units 224, 228, 232 and 236 corresponds to a multiplier stage of the 1024-point radix-$2^2$ DIF algorithm.

Each of the butterfly calculation units 204, 208, 212, 216 and 220 includes a respective memory 260, a respective butterfly calculator 262, and a respective controller 264. The memory 260 is for storing inputs to the butterfly calculation unit so that the inputs can be used for later calculations. The memory 260 is also for storing outputs of one of the pair of BF stages that are subsequently used by the other BF stage. In other words, the memory 260 provides storage for two FFT stages. For instance, inputs to the butterfly calculation unit 204 may be received in sequence in the following order: x(n), x(n+1), x(n+2), x(n+3), . . . , where x is an input value and n is an index. One output of the first BF stage may be calculated as x(n)+x(n+512). Thus, in order to calculate this value, the value x(n) must be stored at least until the value x(n+512) is received. Similarly, in order to calculate a second BF stage output, which is calculated using a pair of first BF stage outputs, one of the first BF stage outputs must be stored at least until the other first BF stage output has been calculated.

As described previously, the first FFT stage of an N-point radix-$2^2$ DIF algorithm, where N is a power of 2, will require at least N/2 memory locations, and each subsequent stage will require ½ the memory locations of the previous stage. Therefore, the memory 260(1) may include 768 memory locations (i.e., 512 for the first BF stage and 256 for the second BF stage). Similarly, the memory 260(2) may include 192 memory locations (i.e., 128 for the third BF stage and 64 for the fourth BF stage). Similarly, the memory 260(3) may include 48 memory locations (i.e., 32 for the fifth BF stage and 16 for the sixth BF stage). The memory 260(4) may include 12 memory locations (i.e., 8 for the seventh BF stage and 4 for the eighth BF stage). Similarly, the memory 260(5) may include 3 memory locations (i.e., 2 for the ninth BF stage and 1 for the tenth BF stage).

Each butterfly calculator 262 performs additions and subtractions for the butterfly calculation unit. Each control unit 264 generally controls the butterfly calculation unit to generate outputs corresponding to the appropriate pair of BF stages. For example, the control unit 264 may configure the butterfly calculator 262 to perform either an addition or a subtraction. Additionally, the control unit 264 may configure the butterfly calculator 262 to perform a multiply by –j operation when appropriate. Further, the control unit 264 may route appropriate values from the memory 260 to the butterfly calculator 262. Still further, the control unit 264 may decide when an input to the butterfly calculation unit should be routed to the butterfly calculator 262. For instance, when the butterfly calculator 262 is calculating an output of the latter BF stage, the butterfly calculator 262 will not utilize an input to the butterfly calculation unit.

The control unit 264 may be coupled to the memory 260 and the butterfly calculator 262. For example, the control unit 264 may generate one or more control signals that are provided to the memory 260 and may generate one or more control signals that are provided to the butterfly calculator 262. The memory 260 and the butterfly calculator 262 may be coupled to each other via routing circuitry such as multiplexers, demultiplexers, switches, etc.

Each of the multiplier units 224, 228, 232 and 236 corresponds to an FFT stage of the 1024-point radix-$2^2$ DIF algorithm that requires a complex multiplier. More specifically, each of the multiplier units 224, 228, 232 and 236 corresponds to a multiplier stage similar to the multiplier stage of FIG. 2. Each of the multiplier units 224, 228, 232 and 236 includes a respective memory 266 and a respective complex multiplier 268. The memory 266 is for storing complex valued "twiddle factors". The multiplier stage of an N-point radix-$2^2$ DIF algorithm, where N is a power of 2, may utilize approximately N/8 twiddle factors, and each subsequent multiplier stage may have approximately ¼ the number of twiddle factors of the previous multiplier stage. Thus, the memories 266(1), 266(2), 266(3) and 266(4) may include approximately 128, 32, 8 and 2 memory locations, respectively. As will be discussed below, techniques may be used to reduce the number of storage locations necessary to store the twiddle factor data. Each of the memories 266 may be a read only memory (ROM), for example, although other types of memories can be utilized.

In operation, input values (i.e., x(n), x(n+1), x(n+2), . . . ) are provided sequentially to the butterfly calculation unit 204, which stores 512 of them in its memory 260(1). Once 512 input values have been stored, the butterfly calculation unit 204 begins calculating outputs that correspond to outputs of the first BF stage of the 1024-point FFT algorithm. Two hundred and fifty six of these outputs of the first BF stage of the 1024-point FFT algorithm will also be stored in the memory 260(1). After enough outputs of the first BF stage of the 1024-point FFT algorithm have been calculated, the butterfly calculation unit 204 may begin calculating outputs that correspond to outputs of the second BF stage of the 1024-point FFT algorithm. Thus, eventually the butterfly calculation unit 204 will be calculating, effectively simultaneously, outputs that correspond to outputs of the first BF stage of the 1024-point FFT algorithm and outputs of the second BF stage of the 1024-point FFT algorithm. This is possible because the butterfly calculation unit 204 operates at a clock speed that is higher than the effective sampling rate of the input signal and is able to time share its resources.

The outputs of the butterfly calculation unit 204 (i.e., the outputs of the second BF stage) are sequentially provided to the multiplier unit 224, which multiplies each of these outputs by a corresponding twiddle factor value stored in its memory 266(1). Outputs of the multiplier unit 224 are provided to the butterfly calculation unit 208. The butterfly calculation unit 208 operates in a manner similar to that of the butterfly calculation unit 204, but calculates outputs that correspond to outputs of the third BF stage and the fourth BF stage of the 1024-point FFT algorithm. The outputs of the butterfly calculation unit 208 (i.e., the outputs of the fourth BF stage) are sequentially provided to the multiplier unit 228, which multiplies each of these outputs by a corresponding twiddle factor value stored in its memory 266(2).

In a similar manner, the remainder of the butterfly calculation units and multiplier units operate to calculate the remaining stages of the FFT algorithm. Eventually, final FFT output values are generated by the butterfly calculation unit 220.

Figure 1:
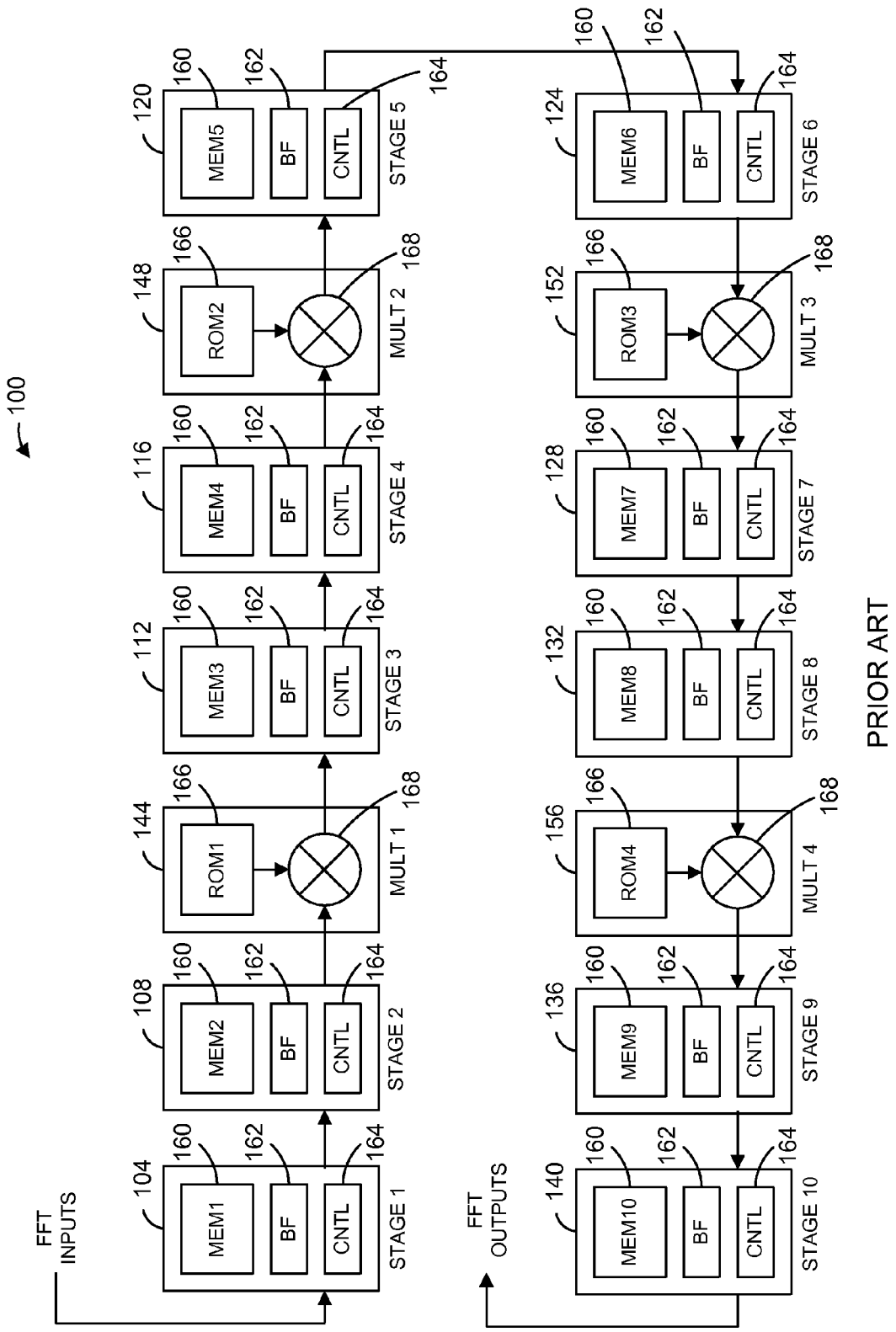
FIG. 1 is a block diagram of a prior art pipelined fast Fourier transform (FFT) calculator.

It can be seen that the example pipelined FFT calculator 200 of FIG. 3 has one half the number of butterfly calculation units as compared to the FFT calculator 100 of FIG. 1. Additionally, it can be seen that the example pipelined FFT calculator 200 of FIG. 3 has one half the number of butterfly calculation unit memories as compared to the FFT calculator 100 of FIG. 1. Although the cumulative number of memory locations of the FFT calculator 200 and the FFT calculator 100 may be approximately equal, the cumulative area needed to implement the memories 260 may be less than the cumulative area needed to implement the memories 160. For example, in the FFT calculator 200, the memory 260(1) of FIG. 3 essentially takes the place of the two memories 160 of butterfly calculation units 104 and 108. These memories 160 are not a single memory unit and are distributed between two different pipeline stages, and thus require two sets of overhead circuitry. On the other hand, because the memory 260(1) of FIG. 3 is a single undistributed (i.e., integrated) memory unit, it only requires one set of overhead circuitry. Thus, the memory 260(1) of FIG. 3 may be implemented using less area than the two memories 160 of butterfly calculation units 104 and 108 of FIG. 1.

It can be seen that the example pipelined FFT calculator 200 of FIG. 3 has one half the number of butterfly calculators 262 as compared to the number of butterfly calculators 162 of the FFT calculator 100 of FIG. 1. Thus, the cumulative area due to butterfly calculators 262 for the FFT calculator 200 may be less than that of the FFT calculator 100.

Similarly, it can be seen that the example pipelined FFT calculator 200 of FIG. 3 has one half the number of controllers 264 as compared to the number of controllers 164 of the FFT calculator 100 of FIG. 1. Each controller 264 may be more complicated than each of the controllers 164 because each controller 264 is for controlling two BF stages as opposed to only one BF stage. However, each controller 264 may be implemented using a smaller cumulative area as compared to the cumulative area of two corresponding controllers 164. Thus, the cumulative area due to controllers 264 for the FFT calculator 200 may be less than that of the FFT calculator 100.

The single memory 260 provides storage for inputs to the butterfly calculation unit as well as outputs of one of the BF stages that are needed by the other BF stage. In some implementations, the memory cells of the single memory 260 may be laid out in a contiguous area as opposed to having substantial portions of the memory cells distributed across two or more separated areas (for example, one area for storing inputs to the butterfly calculation unit and another separate area for storing outputs of the initial BF stage). For example, the single memory 260 may be a contiguous memory array. Also, in some implementations, the memory 260 may include common overhead circuitry as opposed to two or more separate sets of overhead circuitry (for example, one overhead circuitry associated with storing and retrieving inputs to the butterfly calculation unit and another separate overhead circuitry associated with storing and retrieving outputs of the initial BF stage). For example, the memory 260 may include a single write interface that permits writing to all locations in the memory 260, as opposed to a first write interface that only permits writing to a first subset of the memory locations and a second separate write interface that only permits writing to a second subset of the memory locations, where the first subset and the second subset are non-overlapping. As another example, the memory 260 may include a single read interface that permits reading from all locations in the memory 260, as opposed to a first read interface that only permits reading from a first subset of the memory locations and a second separate read interface that only permits reading from a second subset of the memory locations, where the first subset and the second subset are non-overlapping. As yet another example, the single memory may include a single read/write interface that permits reading from and writing to all locations in the memory 260. In some implementations, the single memory 260 may have a single physical address space, as opposed to two separate physical address spaces. In some implementations, the memory 260 may be a single-port memory, whereas in other implementations the memory 260 may be a first-in-first-out (FIFO) memory.

The controller 264 may generate control signals (not shown) that are used to control the operation of the butterfly calculation unit. At least some of these control signals may be coupled to the memory 260 and the butterfly calculator 262. For example, the controller 264 may generate one or more control signals that are coupled to the memory 260 to control reading to and writing from the memory 260. Also, the controller may include multiplexers, demultiplexers, switches, etc., for routing data to and from the memory 260. For example, data received as input to the butterfly calculation unit or data generated by the butterfly calculator 262 (e.g., outputs of one of the BF stages) may be routed to a write interface of the memory. Similarly, data from a read interface of the memory 260 may be routed to an input of the butterfly calculator 262 or to an output of the butterfly calculation unit. Also, the controller may include multiplexers, demultiplexers, switches, etc., for routing input data to the butterfly calculator 262. For example, data received as input to the butterfly calculation unit may be routed to an input of the butterfly calculator 262. The controller 264 may generate control signals to control such routing circuitry (e.g., multiplexers, demultiplexers, switches, etc.). In some embodiments, the multiply by −j circuitry may be considered part of the controller 264 rather than part of the butterfly calculator 262.

Similarly, the controller 264 may generate one or more control signals that are coupled to the butterfly calculator 262. For example, one or more control signals may control whether the butterfly calculator 262 performs an addition or a subtraction (i.e., the controller 264 may configure the butterfly calculator 262 to perform either an addition or subtraction operation). As another example, one or more control signals may control whether the butterfly calculator 262 performs a multiply by −j operation (i.e., the controller 264 may configure the butterfly calculator 262 to perform a multiply by −j operation when appropriate).

In order to reduce the area required to implement each of the multiplier units 224, 228, 232, 236, various techniques optionally may be employed. For instance, the symmetry of sine and cosine functions can be exploited to reduce the number of memory locations in the memories 266 needed to store twiddle factors. Additionally, the multiplier 268 could be implemented so that a first operand input was only half of the actual operand word length. The multiplier 268 would perform a multiplication operation by multiplying one half of the first operand by the second operand to generate a first partial product and then multiplying the other half of the first operand by the second operand unit to generate a second partial product. The multiplier unit could include an accumulator circuit to appropriately combine the two partial products to generate the full product. Such an implementation takes advantage of the fact that the clock rate of the multiplier unit is faster than the effective sampling rate of the input to the FFT calculator 200.

Although a device for calculating a 1024-point FFT was described, one of ordinary skill in the art will recognize that similar devices for calculating FFTs of other sizes could also be utilized. Additionally, one of ordinary skill in the art will recognize that the example device 200 could be modified to implement an inverse FFT. Further, another implementation of an FFT or inverse FFT calculator could utilize one or more butterfly calculation blocks such as in FIG. 2 but also use other types of butterfly calculation blocks to implement some of the FFT stages, for example.

Figure 6A:
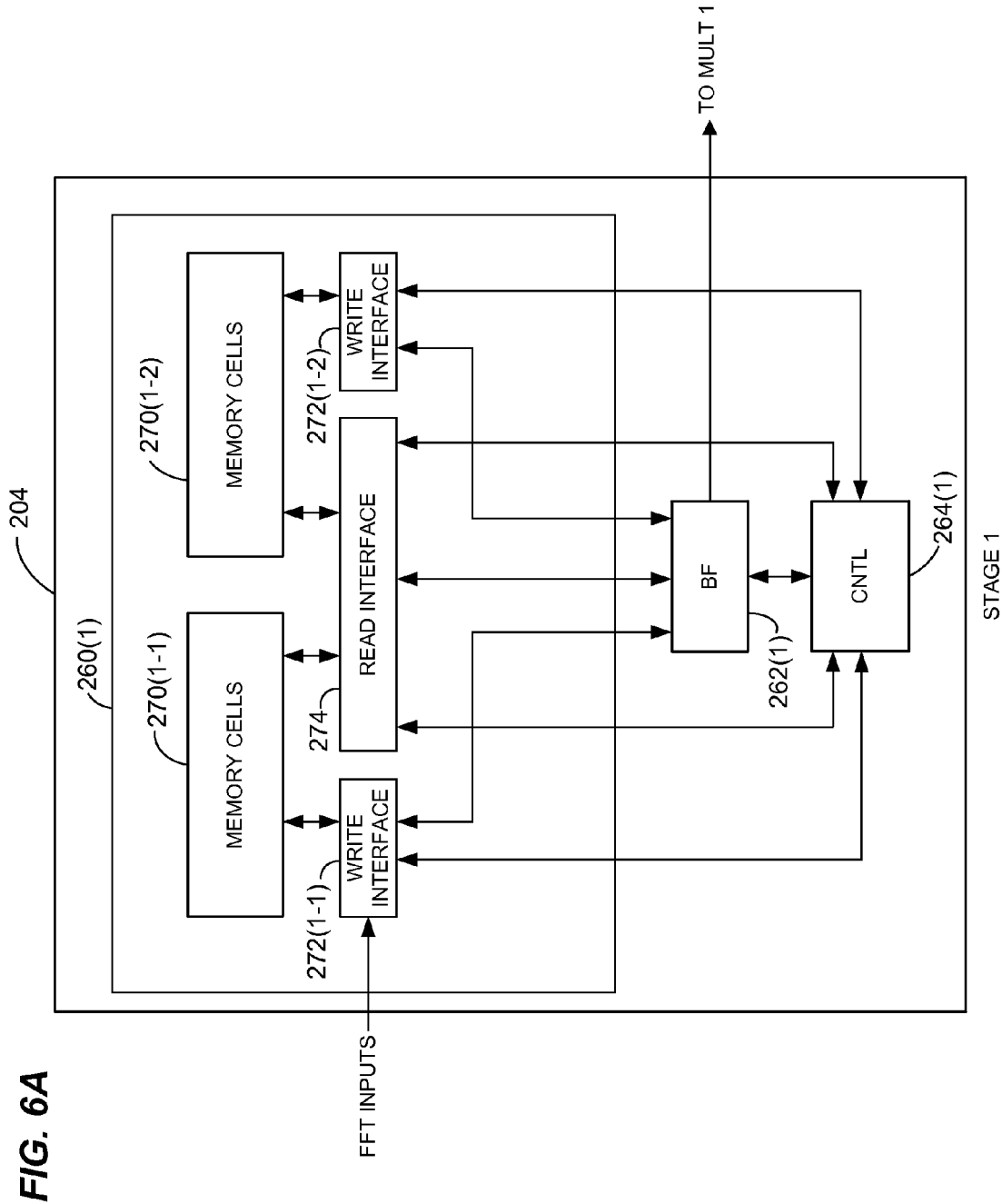
FIG. 6A is a block diagram of an alternative implementation of a butterfly calculation unit that may be used in implementing the FFT calculator of FIG. 3.
Figure 6B:
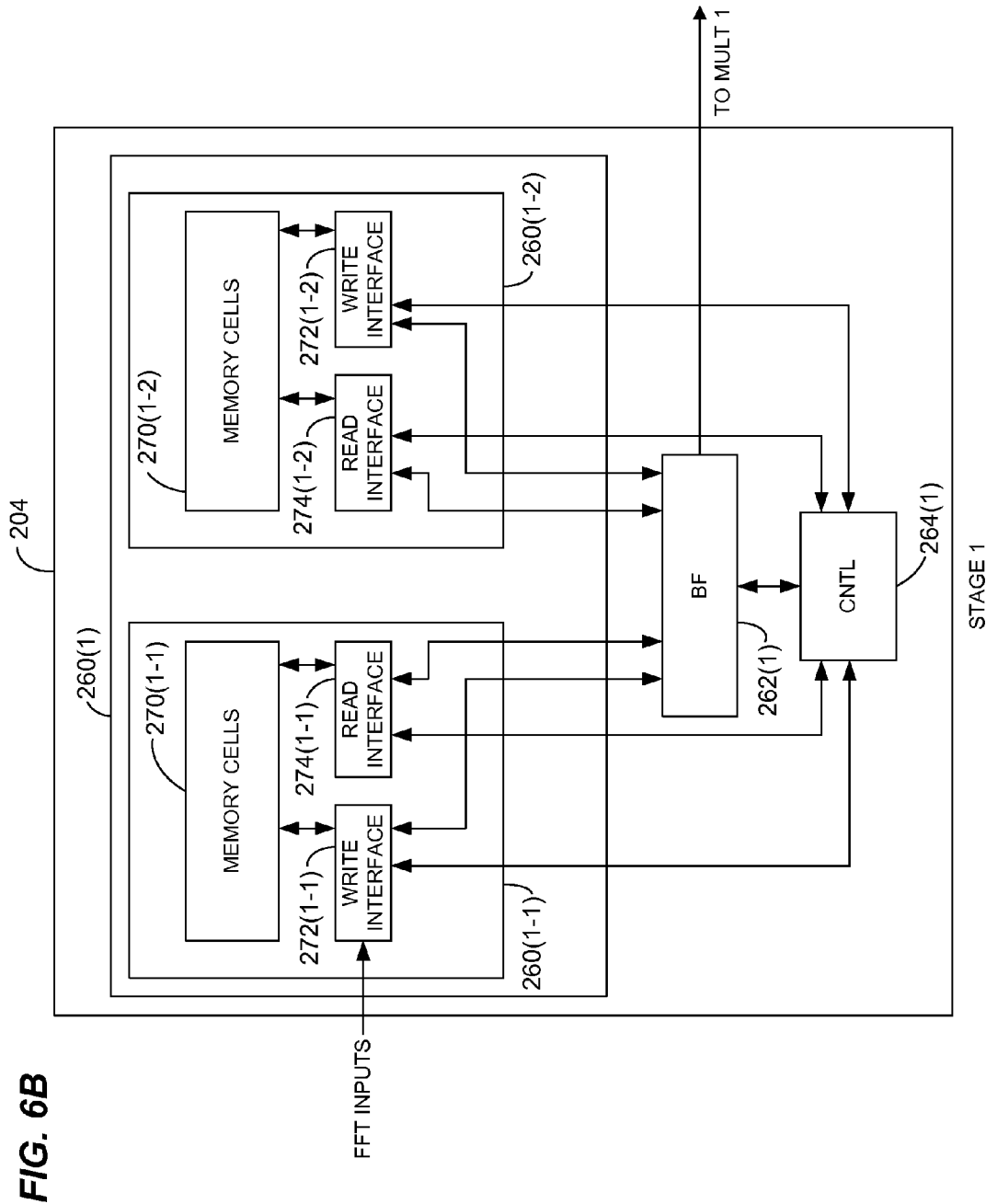
FIG. 6B is a block diagram of another alternative implementation of a butterfly calculation unit that may be used in implementing the FFT calculator of FIG. 3.

One of ordinary skill in the art will recognize many additional modifications, changes, additions and/or deletions to the above-discussed embodiments. For example, in some other implementations, a butterfly calculation unit with a single memory may include two, three, four, or more butterfly calculators. In another implementation, a butterfly calculation unit may include two memories that share some circuitry but not all. For example, the two memories may have separate read interfaces but share a common write interface, or vice versa. For example, FIG. 6A is a block diagram of an alternative implementation of the first butterfly calculation unit 204 where the memory 260(1) includes two partially separate memory units. Of course, the implementation shown in FIG. 6A could also or alternatively be used for one or more of the memories 260(2), 260(3), 260(4), and 260(5). As shown in FIG. 6A, the memory 260(1) includes separate areas 270(1-1) and 270(1-2) of memory cells, separate write interfaces 272(1-1) and 272(1-2), and a common read interface 274. In such an implementation, the butterfly calculation unit may include only a single butterfly calculator, or it may include multiple butterfly calculators. Similarly, the butterfly calculation unit may include two butterfly calculators that share some circuitry but not all. For example, the two butterfly calculators may share a sign inverter, a latch, etc. In such an implementation, the butterfly calculation unit may include only a single memory, or it may include multiple memories. For example, FIG. 6B is a block diagram of another alternative implementation of the first butterfly calculation unit 204 where the memory 260(1) includes two separate memory units 260(1-1) and 260(1-2). Of course, as with FIG. 6A, the implementation shown in FIG. 6B could also or alternatively be used for one or more of the memories 260(2), 260(3), 260(4), and 260(5). As shown in FIG. 6B, the memory unit 260(1-1) includes the area 270(1-1) of memory cells, the write interface 272(1-1), and a read interface 274(1-1). Likewise, the memory unit 260(1-2) includes the area 270(1-2) of memory cells, the write interface 272(1-2), and a read interface 274(1-2). Similarly, the butterfly calculation unit may include two controllers that share some circuitry but not all. More generally, each butterfly calculation unit 204, 208, 212, 216 and 220 uses shared resources to calculate two stages of the FFT algorithm. In other words, at least one resource of the butterfly calculation unit is used in calculating both stages of the FFT algorithm. Such a shared resource may include a single memory, common circuitry of two memories, a single butterfly calculator, common circuitry shared by two butterfly calculators, a single controller, common circuitry shared by two controllers, etc.

Additionally, although in the example FFT calculator 200 of FIG. 3, each butterfly calculation unit calculates two stages of an FFT algorithm, in other implementations, each butterfly calculation unit may use shared resources to calculate, three, four, five, etc., stages of an FFT algorithm. As a specific example, an FFT calculator could include ceil($\log_2 N/4$) butterfly calculation units that each use shared resources to calculate four stages of the 1024-point FFT algorithm. Each butterfly calculation unit could operate at a clock speed that is at least four times the effective sampling rate of the input signal. In such embodiments, the calculation unit may be simultaneously calculating some number of stages of the FFT algorithm. For example, although the butterfly calculation unit may use shared resources to four stages, at any one time, it may be simultaneously calculating at most three stages. For instance, once calculations for the fourth stage begin, calculations for the first stage may have already ended. In this case, the butterfly calculation optionally may begin first stage calculations for a next set of data.

Although the example FFT calculator 200 of FIG. 3 implements a radix-$2^2$ DIF algorithm, similar FFT calculators may implement different FFT algorithms, such as decimation in time (DIT) algorithms, etc.

Figure 4:
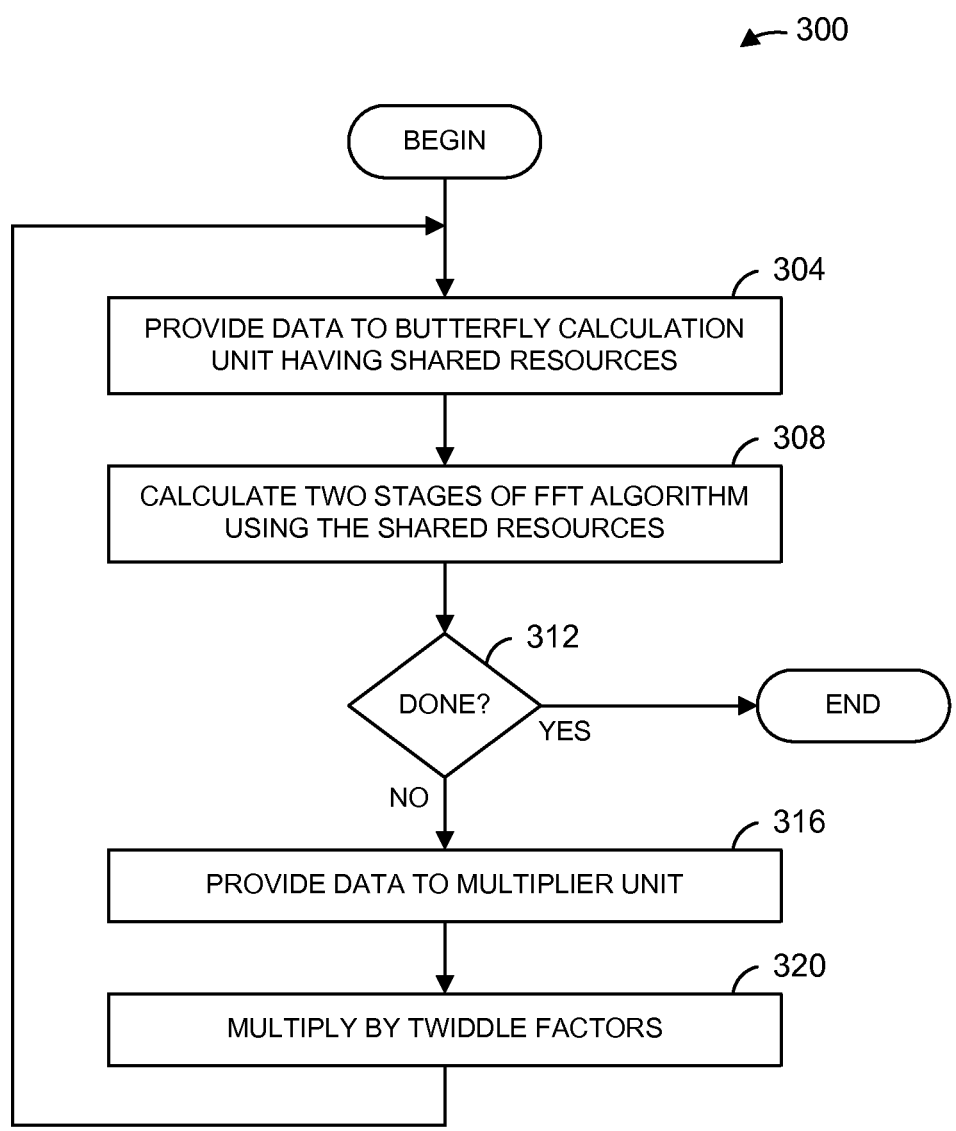
FIG. 4 is a flow diagram of an example method for calculating an FFT algorithm.

FIG. 4 is a flow diagram of an example method 300 for implementing the radix-$2^2$ DIF FFT algorithm. The method 300 may be implemented by the example pipelined DFT calculator 200 of FIG. 3 and will be described with reference to FIG. 3 for ease of explanation. Of course, the method 300 may be implemented by calculators other than the FFT calculator 200.

At a block 304, data to be processed may be provided to a butterfly calculation unit that is configured to use shared resources to calculate simultaneously two stages of an FFT algorithm. Referring to FIG. 3, a set of input data is provided to the butterfly calculation unit 204, for example, which is configured to use shared resources to calculate simultaneously two stages of an FFT algorithm as described above.

At a block 308, two stages of the FFT algorithm are simultaneously calculated using shared resources of the butterfly calculation unit such as described above. For example, the butterfly calculation unit may include a single memory in which data for two stages is stored. As another example, the butterfly calculation unit may include a single butterfly calculator that is time-shared to calculate simultaneously two stages of the FFT algorithm. As yet another example, a single controller may generate control signals for simultaneously calculating two stages of the FFT algorithm, etc.

If the FFT algorithm is completed (block 312), the flow may end. For example, if the last stage of the FFT algorithm has been calculated, the flow may end. If the FFT algorithm is not completed, at a block 316 output data from the butterfly calculation unit may be provided to a multiplier unit.

In a similar manner, data are provided to each of the butterfly calculation units 208, 212, 216 and 220. In other calculators, the butterfly calculation unit may be configured to calculate simultaneously three, four, five, etc., stages of an FFT algorithm using shared resources. Referring to FIG. 3, output data from the butterfly calculation unit 204 is provided to the multiplier unit 224, for example. At a block 320, the multiplier unit multiplies the data by the appropriate twiddle factors. Then, the flow may return to the block 304, at which output data from the multiplier unit is provided as input to the next butterfly calculation unit. Referring to FIG. 3, output data from the multiplier unit 224 is provided as input to the butterfly calculation unit 208, for example.

It is to be understood that the method 300 may be implemented in a pipeline fashion. For example, the butterfly calculation unit need not have completed calculating its stages of the FFT algorithm before the subsequent multiplier unit begins multiplying outputs of the butterfly calculation unit by the twiddle factors. Similarly, the multiplier unit need not have completed its multiplication stage of the FFT algorithm before the subsequent butterfly calculation unit begins calculating its stages of the FFT algorithm. Also, a butterfly calculation unit or multiplier unit may begin processing data corresponding to a new set of input data while it is finishing calculations for the current set of data. Although the flow of the method 300 is shown to end in FIG. 3, a butterfly calculation unit or multiplier unit in a pipeline will not typically sit idle but will begin implementing calculations for the next set of data.

Although the method 300 was described in the context of a butterfly calculation unit that simultaneously calculates two stages of an FFT algorithm, more generally the method may utilize a butterfly calculation unit that simultaneously calculates two or more stages of an FFT algorithm (e.g., two stages, three stages, four stages, etc.). In such implementations, the method 300 may be modified so that data is provided to multiplier units at appropriate times.

One of ordinary skill in the art will recognize that the method 300 may be modified in a variety of ways. For example, the method 300 may be modified to implement different FFT algorithms in which twiddle factor multiplications occur at different stages, different numbers of stages are calculated simultaneously, etc.

The example FFT calculator 200 may be implemented in hardware. For example, some or all of the FFT calculator 200 may be implemented in, for example, a custom integrated circuit (IC), an application specific integrated circuit (ASIC), a field programmable logic array (FPGA), a programmable logic array (PLA), etc. Additionally or alternatively, some of the example FFT calculator 200 may be implemented in software stored in, for example, a memory and implemented on a processor or implemented in firmware as desired. For example, some of one or more of the controllers 264 may be implemented using software or firmware. If implemented in software, the routines may be stored in any computer readable memory such as in RAM, ROM, flash memory, a magnetic disk, a laser disk, or other storage medium. Likewise, this software may be delivered to a device (such as a transmitter, receiver, hard disk controller, etc.) via any known or desired delivery method including, for example, over a communication channel such as a telephone line, the Internet, a wireless connection, etc., or via a transportable medium, such as a computer-readable disk, flash drive, etc. Delivery methods may include, for example, delivery on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, a wireless communication channel, the Internet, etc. (which are viewed as being the same as or interchangeable with providing such software via a transportable storage medium).

The above-described techniques, apparatus, etc., may be embodied in any type of device that calculates an FFT or an inverse FFT such as communication devices for use in wired or wireless communication systems that utilize OFDM. Referring now to FIGS. 5A-5F, various example devices that may above-described techniques, apparatus, etc. are shown.

Figure 5A:
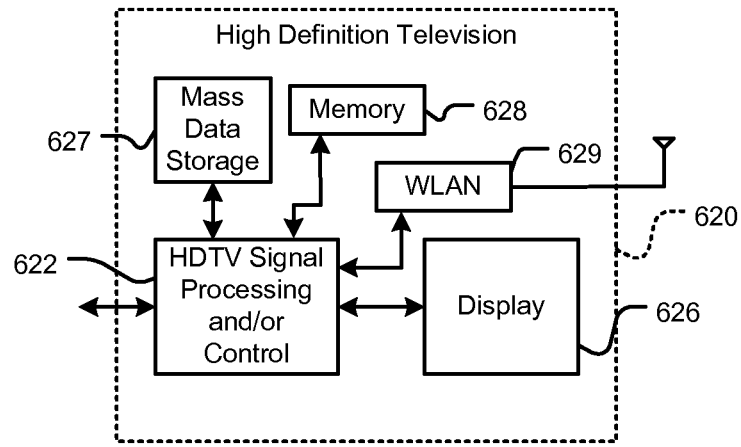
FIG. 5A is a block diagram of a high definition television that may utilize an FFT calculator such as the FFT calculator of FIG. 3 or a method such as the method of FIG. 4.

Referring to FIG. 5A, techniques such as described above may be utilized in a high definition television (HDTV) 620. The HDTV 620 includes signal processing and/or control circuits, which are generally identified in FIG. 5A at 622, a WLAN interface 629, and a mass data storage 627. An FFT or inverse FFT calculator may be utilized in the WLAN interface 629 or the signal processing circuit and/or control circuit 622, for example. HDTV 620 receives HDTV input signals in either a wired or wireless format and generates HDTV output signals for a display 626. In some implementations, signal processing circuit and/or control circuit 622 and/or other circuits (not shown) of HDTV 620 may process data, perform coding and/or encryption, perform calculations, format data and/or perform any other type of HDTV processing that may be required.

HDTV 620 may communicate with mass data storage 627 that stores data in a nonvolatile manner such as optical and/or magnetic storage devices. The mass data storage 627 may include one or more hard disk drives (HDDs) and/or one or more digital versatile disks (DVDs). One or more of the HDDs may be a mini HDD that includes one or more platters having a diameter that is smaller than approximately 1.8". HDTV 620 may be connected to memory 628 such as RAM, ROM, low latency nonvolatile memory such as flash memory and/or other suitable electronic data storage. HDTV 620 also may support connections with a WLAN via the WLAN network interface 629.

Figure 5B:
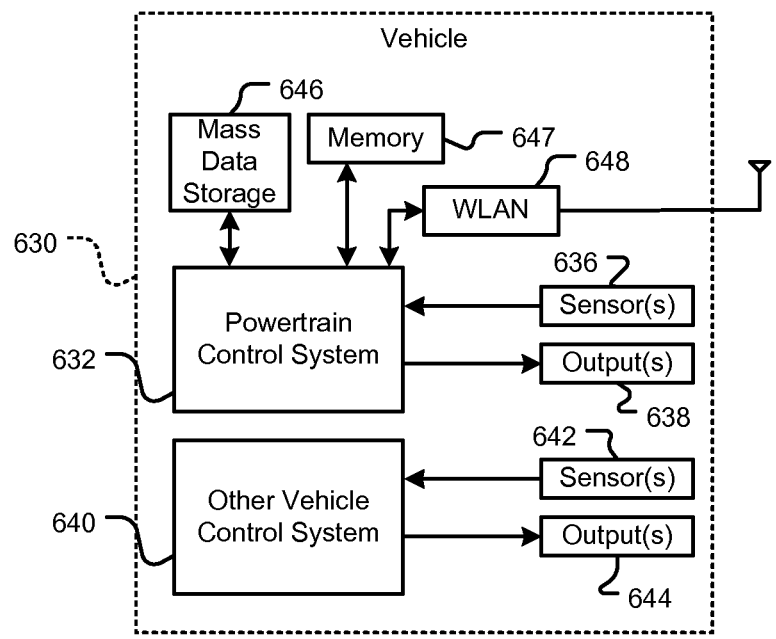
FIG. 5B is a block diagram of a vehicle that may utilize an FFT calculator such as the FFT calculator of FIG. 3 or a method such as the method of FIG. 4.

Referring now to FIG. 5B, techniques such as described above may be utilized in a control system of a vehicle 630. In some implementations, a powertrain control system 632 receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals. An FFT or inverse FFT calculator may be implemented in the powertrain control system 632, for example.

A control system 640 may likewise receive signals from input sensors 642 and/or output control signals to one or more output devices 644. In some implementations, control system 640 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated. An FFT or inverse FFT calculator may be implemented in the control system 640, for example.

Powertrain control system 632 may communicate with mass data storage 646 that stores data in a nonvolatile manner. Mass data storage 646 may include optical and/or magnetic storage devices for example hard disk drives HDD and/or DVDs. One or more of the HDDs may be a mini HDD that includes one or more platters having a diameter that is smaller than approximately 1.8". Powertrain control system 632 may be connected to memory 647 such as RAM, ROM, low latency nonvolatile memory such as flash memory and/or other suitable electronic data storage. Powertrain control system 632 also may support connections with a WLAN via a WLAN network interface 648. An FFT or inverse FFT calculator such as described above may be implemented in the WLAN interface 648. The control system 640 may also include mass data storage, memory and/or a WLAN interface (all not shown).

Figure 5C:
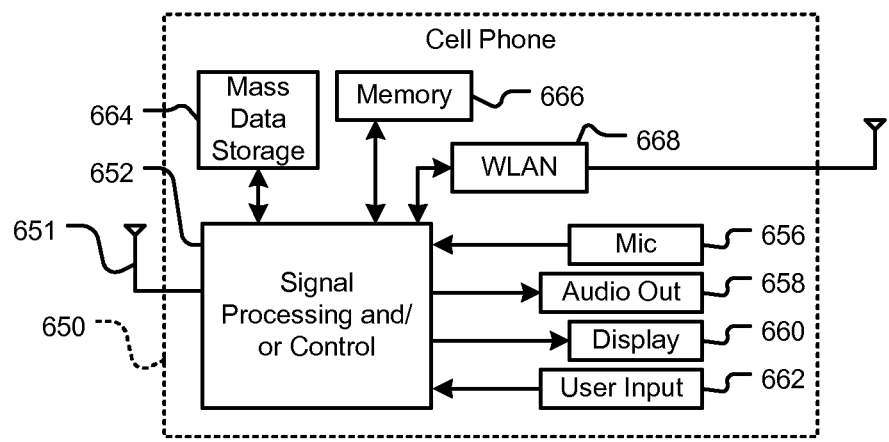
FIG. 5C is a block diagram of a mobile phone that may utilize an FFT calculator such as the FFT calculator of FIG. 3 or a method such as the method of FIG. 4.

Referring now to FIG. 5C, techniques such as described above may also be utilized in a cellular phone 650 that may include a cellular antenna 651. The cellular phone 650 includes signal processing and/or control circuits, which are generally identified in FIG. 5C at 652, a WLAN interface 668, and a mass data storage 664. An FFT or inverse FFT calculator may be implemented in the signal processing and/or control circuits 652 and/or the WLAN interface 668, for example. In some implementations, cellular phone 650 includes a microphone 656, an audio output 658 such as a speaker and/or audio output jack, a display 660 and/or an input device 662 such as a keypad, pointing device, voice actuation and/or other input device. Signal processing and/or control circuits 652 and/or other circuits (not shown) in cellular phone 650 may process data, perform coding and/or encryption, perform calculations, format data and/or perform other cellular phone functions.

Cellular phone 650 may communicate with mass data storage 664 that stores data in a nonvolatile manner such as optical and/or magnetic storage devices for example hard disk drives HDD and/or DVDs. At least one HDD may be a mini HDD that includes one or more platters having a diameter that is smaller than approximately 1.8". Cellular phone 650 may be connected to memory 666 such as RAM, ROM, low latency nonvolatile memory such as flash memory and/or other suitable electronic data storage. Cellular phone 650 also may support connections with a WLAN via a WLAN network interface 668.

Figure 5D:
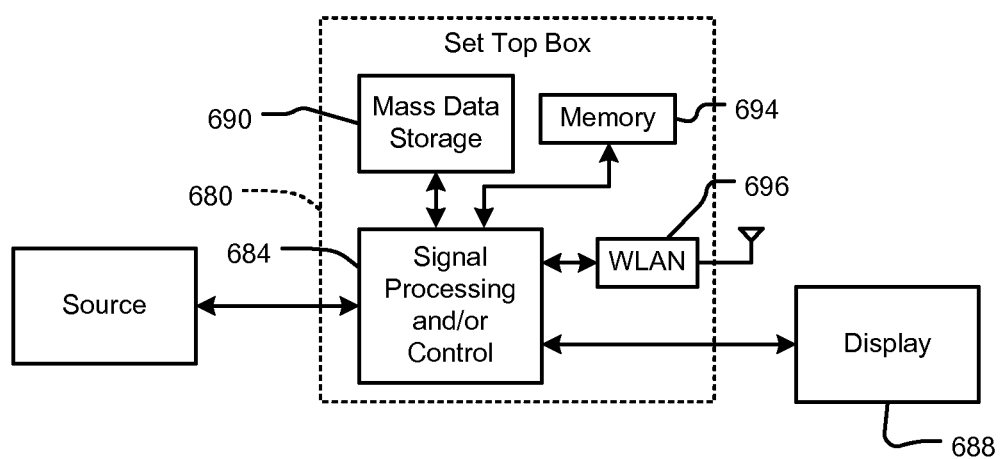
FIG. 5D is a block diagram of a set top box that may utilize an FFT calculator such as the FFT calculator of FIG. 3 or a method such as the method of FIG. 4.

Referring now to FIG. 5D, techniques such as described above may be utilized in a set top box 680. The set top box 680 includes signal processing and/or control circuits, which are generally identified in FIG. 5D at 684, a WLAN interface 696, and a mass data storage device 690. An FFT or inverse FFT calculator may be implemented in the signal processing and/or control circuits 684 and/or the WLAN interface 696, for example. Set top box 680 receives signals from a source such as a broadband source and outputs standard and/or high definition audio/video signals suitable for a display 688 such as a television and/or monitor and/or other video and/or audio output devices. Signal processing and/or control circuits 684 and/or other circuits (not shown) of the set top box 680 may process data, perform coding and/or encryption, perform calculations, format data and/or perform any other set top box function.

Set top box 680 may communicate with mass data storage 690 that stores data in a nonvolatile manner. Mass data storage 690 may include optical and/or magnetic storage devices for example hard disk drives HDD and/or DVDs. At least one HDD may be a mini HDD that includes one or more platters having a diameter that is smaller than approximately 1.8". Set top box 680 may be connected to memory 694 such as RAM, ROM, low latency nonvolatile memory such as flash memory and/or other suitable electronic data storage. Set top box 680 also may support connections with a WLAN via the WLAN network interface 696.

Figure 5E:
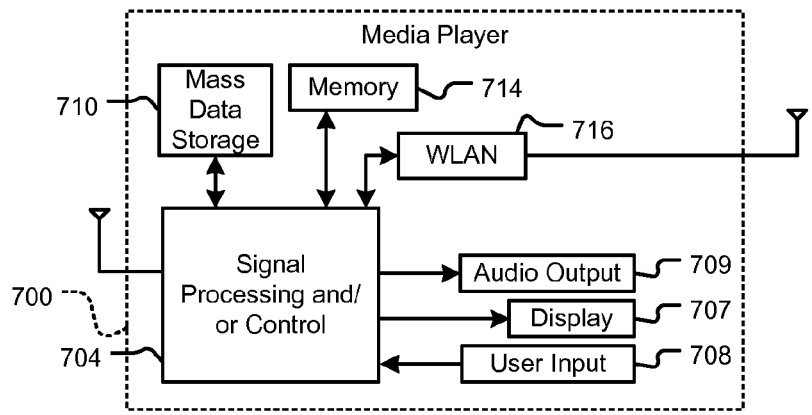
FIG. 5E is a block diagram of a media player that may utilize an FFT calculator such as the FFT calculator of FIG. 3 or a method such as the method of FIG. 4.

Referring now to FIG. 5E, techniques such as described above may be utilized in a media player 700. The media player 700 may include signal processing and/or control circuits, which are generally identified in FIG. 5E at 704, a WLAN interface 716, and a mass data storage device 710. An FFT or inverse FFT calculator may be implemented in the signal processing and/or control circuits 704 and/or the WLAN interface 716, for example. In some implementations, media player 700 includes a display 707 and/or a user input 708 such as a keypad, touchpad and the like. In some implementations, media player 700 may employ a graphical user interface (GUI) that typically employs menus, drop down menus, icons and/or a point-and-click interface via display 707 and/or user input 708. Media player 700 further includes an audio output 709 such as a speaker and/or audio output jack. Signal processing and/or control circuits 704 and/or other circuits (not shown) of media player 700 may process data, perform coding and/or encryption, perform calculations, format data and/or perform any other media player function.

Media player 700 may communicate with mass data storage 710 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may be a mini HDD that includes one or more platters having a diameter that is smaller than approximately 1.8". Media player 700 may be connected to memory 714 such as RAM, ROM, low latency nonvolatile memory such as flash memory and/or other suitable electronic data storage. Media player 700 also may support connections with a WLAN via a WLAN network interface 716. Still other implementations in addition to those described above are contemplated.

Figure 5F:
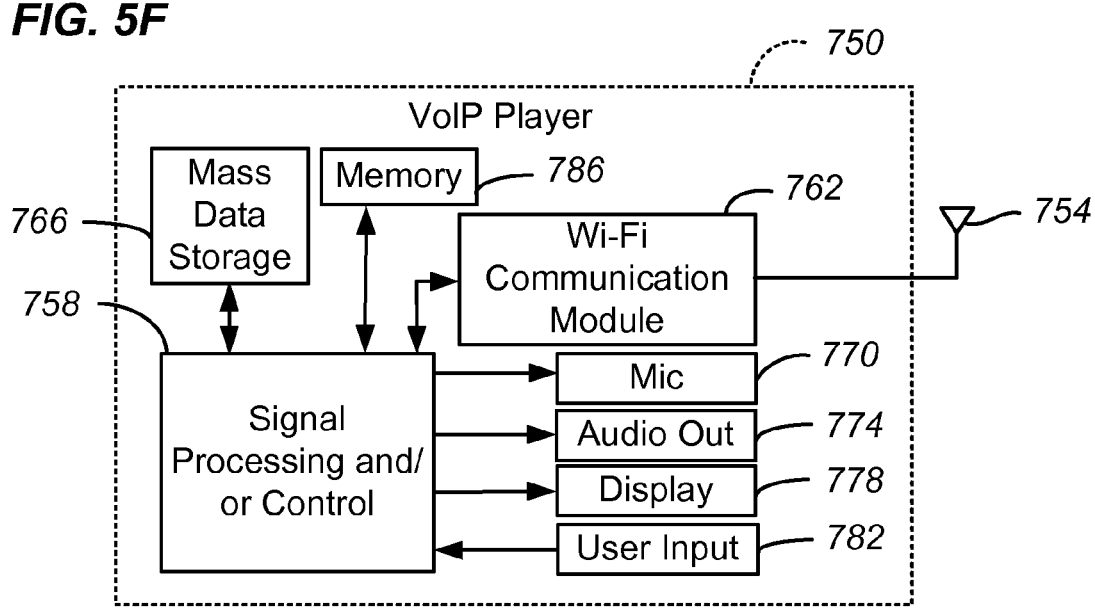
FIG. 5F is a block diagram of a voice over IP device that may utilize an FFT calculator such as the FFT calculator of FIG. 3 or a method such as the method of FIG. 4.

Referring to FIG. 5F, techniques such as described above may be utilized in a Voice over Internet Protocol (VoIP) phone 750 that may include an antenna 754, signal processing and/or control circuits 758, a wireless interface 762, and a mass data storage 766. An FFT or inverse FFT calculator may be implemented in the signal processing and/or control circuits 758 and/or the wireless interface 762, for example. In some implementations, VoIP phone 750 includes, in part, a microphone 770, an audio output 774 such as a speaker and/or audio output jack, a display monitor 778, an input device 782 such as a keypad, pointing device, voice actuation and/or other input devices, and a Wireless Fidelity (Wi-Fi) communication module 762. Signal processing and/or control circuits 758 and/or other circuits (not shown) in VoIP phone 750 may process data, perform coding and/or encryption, perform calculations, format data and/or perform other VoIP phone functions.

VoIP phone 750 may communicate with mass data storage 766 that stores data in a nonvolatile manner such as optical and/or magnetic storage devices, for example hard disk drives HDD and/or DVDs. The HDD may be a mini HDD that includes one or more platters having a diameter that is smaller than approximately 1.8". VoIP phone 750 may be connected to memory 786, which may be a RAM, ROM, low latency nonvolatile memory such as flash memory and/or other suitable electronic data storage. VoIP phone 750 is configured to establish communications link with a VoIP network (not shown) via Wi-Fi communication module 762.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A discrete Fourier transform (DFT) calculation apparatus, comprising:
a multiplier unit; and
a butterfly calculation unit to perform calculations for at least (i) a first stage of a fast Fourier transform (FFT) algorithm and (ii) a second stage of the FFT algorithm, wherein the butterfly calculation unit includes:
a memory device to store input data for at least (i) the first stage of the FFT algorithm and (ii) the second stage of the FFT algorithm;
a butterfly calculator coupled to the memory device, and
a controller coupled to the memory device and the butterfly calculator, the controller configured to control the butterfly calculation unit so that
shared resources of the butterfly calculation unit are time shared while calculating (i) the first stage of the FFT algorithm and (ii) the second stage of the FFT algorithm,
some butterfly calculations for the second stage of the FFT algorithm are performed before all butterfly calculations for the first stage of the FFT algorithm are completed, and
some butterfly calculations for the first stage of the FFT algorithm are performed before all butterfly calculations for the second stage of the FFT algorithm are completed.

2. The apparatus of claim 1, wherein:
the butterfly calculator is a single butterfly calculator device; and
the controller is configured to time share the single butterfly calculator between (i) the first stage of the FFT algorithm and (ii) the second stage of the FFT algorithm.

3. The apparatus of claim 1, wherein:
the controller is a single controller device; and
the butterfly calculation unit is configured to time share the single controller device between (i) the first stage of the FFT algorithm and (ii) the second stage of the FFT algorithm.

4. The apparatus of claim 1, wherein:
the DFT calculation apparatus is for calculating an N-point DFT;
N is a positive integer;
N is a power of 2; and
the DFT calculation apparatus comprises at most $$\frac{\log_2 N}{2}$$

butterfly calculation units.

5. The apparatus of claim 4, wherein:
the DFT calculation apparatus comprises $$\frac{\log_2 N}{2}$$

butterfly calculation units and a plurality of multiplier units; and
the butterfly calculation units and the plurality of multiplier units are coupled in series to form a pipeline of alternating butterfly calculation units and multiplier units.

6. The apparatus of claim 5, wherein:
the DFT calculation apparatus is for calculating a 1024-point DFT; and
the DFT calculation apparatus comprises at most five butterfly calculation units and at most four multiplier units.

7. The apparatus of claim 1, wherein the memory device includes at least two separate memory units.

8. The apparatus of claim 1, wherein the memory device includes at least two partially separate memory units.

9. The apparatus of claim 1, wherein:
the memory device is a single memory device; and
the butterfly calculation unit is configured to time share the single memory device when calculating (i) the first stage of the FFT algorithm and (ii) the second stage of the FFT algorithm.

10. The apparatus of claim 9, wherein the single memory device has only a single physical address space.

11. The apparatus of claim 10, wherein the single memory device is a contiguous memory array.

12. The apparatus of claim 10, wherein the single memory device is a first-in-first-out (FIFO) memory device.

13. The apparatus of claim 1, wherein the multiplier unit includes a read only memory (ROM) and a multiplier.

14. The apparatus of claim 13, wherein:
the multiplier unit operates at a clock speed that is higher than an effective sampling rate of a signal of which a discrete Fourier transform is to be calculated; and
the multiplier unit is configured to generate partial products in series and to combine the partial products to generate a complete product.

15. The apparatus of claim 1, wherein the butterfly calculation unit operates at a clock speed that is higher than an effective sampling rate of a signal of which a discrete Fourier transform is to be calculated.

16. A method of calculating multiple stages of a fast Fourier transform (FFT) algorithm, the method comprising:
providing data to a butterfly calculation unit hardware device;
performing some calculations for a first stage of the FFT algorithm using the butterfly calculation unit hardware device; and
time sharing hardware resources of the butterfly calculation unit hardware device to
perform some calculations for a second stage of the FFT algorithm before completing all butterfly calculations for the first stage of the FFT algorithm, and
perform some calculations for the first stage of the FFT algorithm before completing all butterfly calculations for the second stage of the FFT algorithm.

17. The method of claim 16, wherein time sharing hardware resources of the butterfly calculation unit hardware device includes time sharing a single memory device of the butterfly calculation unit hardware device so that some input data for the first stage of the FFT algorithm and some input data for the second stage of the FFT algorithm are stored in the single memory device at the same time.

18. The method of claim 17, wherein time sharing the single memory device comprises storing some input data for the first stage of the FFT algorithm and some input data for the second stage of the FFT algorithm within a single physical address space of the single memory device at the same time.

19. The method of claim 16, wherein time sharing hardware resources of the butterfly calculation unit hardware device includes time sharing a butterfly calculator device of the butterfly calculation unit hardware device so that the butterfly calculator device
performs some calculations for the second stage of the FFT algorithm before all butterfly calculations for the first stage of the FFT algorithm are completed, and
performs some calculations for the first stage of the FFT algorithm before all butterfly calculations for the second stage of the FFT algorithm are completed.

20. The method of claim 16, wherein time sharing hardware resources of the butterfly calculation unit hardware device includes time sharing a controller device of the butterfly calculation unit hardware device so that the controller device controls the butterfly calculation unit hardware device to
perform some calculations for the second stage of the FFT algorithm before all butterfly calculations for the first stage of the FFT algorithm are completed, and
perform some calculations for the first stage of the FFT algorithm before all butterfly calculations for the second stage of the FFT algorithm are completed.

\* \* \* \* \*